US006967744B1

(12) United States Patent
Kawamoto

(10) Patent No.: US 6,967,744 B1
(45) Date of Patent: Nov. 22, 2005

(54) IMAGE PROCESSING APPARATUS AND METHOD HAVING A DIGITAL SIGNAL PROCESSOR

(75) Inventor: Hiroyuki Kawamoto, Kawasaki (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/443,889

(22) Filed: Nov. 19, 1999

(30) Foreign Application Priority Data

Nov. 20, 1998 (JP) ................................ 10-331288

(51) Int. Cl.[7] ........................ G06F 15/00; G06F 13/12; G03G 15/00

(52) U.S. Cl. .......................... 358/1.9; 358/1.9; 710/74; 399/81

(58) Field of Search ................................ 358/468, 442, 358/1.13, 1.15, 1.9; 370/389, 420, 254; 710/74, 710/305; 707/4, 100; 399/81

(56) References Cited

U.S. PATENT DOCUMENTS 4,454,575 A * 6/1984 Bushaw et al. ............. 345/504
H1677 H * 9/1997 Hu et al. ..................... 358/468
5,699,350 A * 12/1997 Kraslavsky ................. 370/254
2003/0088651 A1* 5/2003 Wilson ....................... 709/221

OTHER PUBLICATIONS

U.S. Appl. No. 09/204,162, filed Dec. 3, 1998, pending.
U.S. Appl. No. 09/161,225, filed Sep. 28, 1998, pending.

* cited by examiner

*Primary Examiner*—Mark Wallerson
*Assistant Examiner*—Saeid Ebrahimi-Dehkordy
(74) *Attorney, Agent, or Firm*—Oblon, Spivak, McClelland, Maier & Neustadt, P.C.

(57) ABSTRACT

An image processing apparatus to receive input image data from an external image input device and to output the input image data to an external image output device after processing the image data. The image processing apparatus includes a first program-storing device for storing a set of program modules for an image processing function therein. A second program-storing device stores plural sets of program modules for plural image processing functions therein. An input device inputs an instruction to execute one of the plural image processing functions. A loading device loads one of the plural sets of program modules stored in the second program-storing device into the first program-storing device corresponding to the image processing function to be executed. A controlling device controls the loading device so as to load one of the plural sets of program modules stored in the second program-storing device into the first program-storing device according to the input instruction. A data processing device processes the input image data according to instructions of the program modules loaded in the first program-storing device.

8 Claims, 8 Drawing Sheets

IMAGE PROCESSING APPARATUS AND METHOD HAVING A DIGITAL SIGNAL PROCESSOR

BACKGROUND OF THE INVENTION

1. Field of the Invention

The present invention relates to an image processing apparatus and a digital signal processing method.

2. Discussion of the Background

An image data processing operation for an image processing system, such as a digital photocopier or a multi-functional image processing apparatus which performs, for example, an image scanning function, a facsimile function, a photocopying function, and a printer function, is generally practiced by a hard-wired logic circuit. On the other hand, an attempt to process image data using a digital signal processor in place of the hard-wired logic circuit is known. As an example, a digital signal processor structured with a so-called "single instruction stream multiple data stream architecture" (SIMD) architecture is known as powerful enough to perform a real-time image data processing in a digital photocopier. A digital signal processor structured with the SIMD architecture has plural signal processors and each of the plural signal processors simultaneously executes the same instruction for different data. Thus, the digital signal processor structured with the SIMD architecture achieves a high throughput of an image processing operation.

In the above-described multi-functional image processing apparatus, because of the diversity of image processing operations, a total program code for a digital signal processor, which can be structured with plural sets of program modules for plural image processing functions, becomes relatively large in size. On the other hand, a capacity of a program-storing device provided inside a digital signal processor may not be large enough for storing such a large size program code. The capacity of the program-storing device can be enlarged to store all sets of program modules for plural image processing functions; however, the result is that the production costs and power consumption of the digital signal processor are generally increased. In addition, when a large number of program modules are simultaneously loaded in the program-storing device, a branching process in a program execution, such as a conditional branching process, may more frequently occur than when a smaller number of program modules are loaded therein, and consequently the throughput of the image processing operation may deteriorate.

SUMMARY OF THE INVENTION

The novel present invention has been made in view of the above-discussed and other problems, and has as one objective to overcome the above-discussed and other problems with the background apparatuses and methods.

Accordingly, an object of the present invention is to provide a novel image processing apparatus and method having a digital signal processor which can decrease a capacity of a program-storing device in the digital signal processor.

Another object of the present invention is to provide a novel image processing apparatus and method having a digital signal processor which can increase a throughput of an image processing operation.

The novel image processing apparatus of the present invention inputs image data from an external image input device and outputs the input image data to an external image output device after processing the image data. A first program-storing device stores a set of program modules for an image processing function therein. A second program-storing device stores plural sets of program modules for plural image processing functions therein. An input device inputs on instruction to execute one of the plural image processing functions. A loading device loads one of the plural sets of program modules stored in the second program-storing device into the first program-storing device. A controlling device controls the loading device so as to load one of the plural sets of program modules stored in the second program-storing device into the first program-storing device according to the instruction input to the instruction input device. A data processing device processes input image data according to instructions of the program modules loaded in the first program-storing device.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE-PREFERRED EMBODIMENTS

Figure 1:
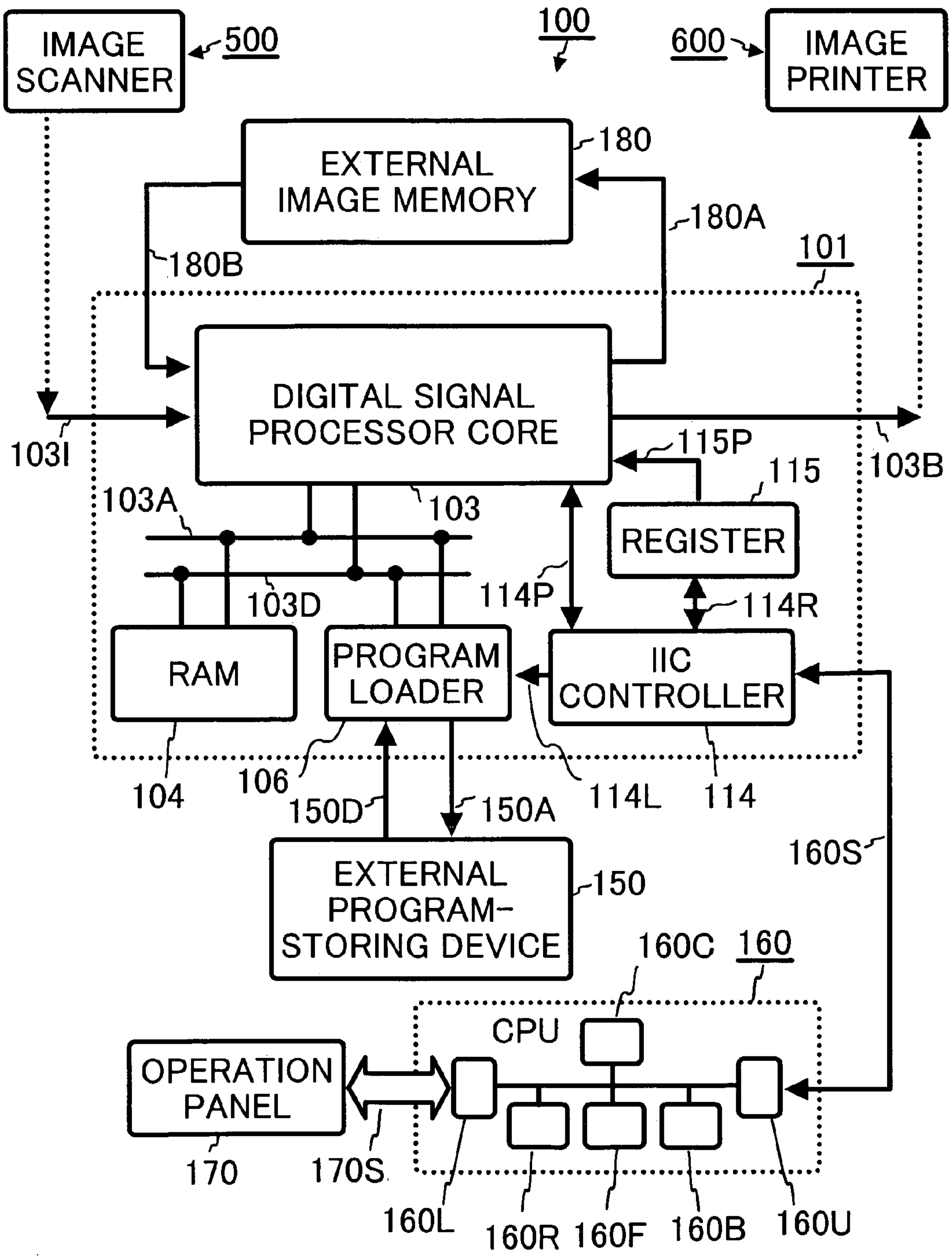
FIG. 1 is a schematic block diagram illustrating a structure of an image processing apparatus according to an embodiment of the present invention.

Image processing apparatuses and methods having a digital signal processor and processing according to preferred embodiments of the present invention are now described with reference to the figures in which like reference numerals indicate identical or corresponding parts throughout the several views.

FIG. 1 is a schematic block diagram illustrating a structure of an image processing apparatus 100 according to an embodiment of the present invention. Referring to FIG. 1, the image processing apparatus 100 performs plural image processing functions such as an image scanner function, a facsimile function, a photocopier function, and a printer function. The image processing apparatus 100 can be connected to an external image input device, for example an image scanner 500, and an external image output device, for example an image printer 600. The combined system having the image processing apparatus 100, the image scanner 500, and the image printer 600 performs as a multi-functional image processing apparatus, and the system can function as an image scanner, a facsimile machine, a photocopier, and a printer.

The image processing apparatus 100 includes a digital signal processor 101, an external program-storing device 150, a central processor unit (CPU) 160, an operation panel 170, and an external image memory 180.

The external program-storing device 150 stores plural sets of program modules for plural image processing functions such as the above-described image scanner function, the facsimile function, the photocopier function, and the printer function. The external program-storing device 150 can be structured as, for example, a read-only memory, a flash memory, a hard disk, a CD-ROM in a CD-ROM drive, a DVD-ROM in a DVD-ROM drive, or the like. The external program-storing device 150 is connected with the digital signal processor 101 by an external address bus 150A and an external data bus 150D in order for one of the plural sets of program modules to be selectively downloaded from the external program-storing device 150 into the digital signal processor 101.

The operation panel 170 inputs an instruction, for example as indicated by an operator, to execute one of the plural image processing functions, i.e., one of the image scanner function, the facsimile function, the photocopier function, and the printer function. In the image scanner function, the photocopier function, and the facsimile function, the operation panel 170 can additionally input an instruction for selecting one of plural image categories of an original document to be processed. In this embodiment, original documents are categorized into either one of a text image, a picture image, and a general image (a mixed text and picture image). In the image scanner function, the photocopier function, and the facsimile function, the operation panel 170 can further input an instruction for selecting one of plural spatial filtering operations and an instruction for selecting one of plural image density conversions. In this embodiment, a density conversion is also referred as a "gamma correction".

In addition, the operation panel 170 displays various kinds of information, such as a status of the image processing apparatus 100, guidance screens for inputting the above-described and other instructions, etc. The operation panel 170 can be constructed by plural buttons and a display panel, such as a liquid-crystal panel, and is connected to the CPU 160 by a signal bus 170S.

The central processing unit (CPU) 160 includes a microprocessor 160C, a random access memory 160R, a data memory with battery-backup 160B, a flash memory 160F, a parallel communication device 160L connected to the operation panel 170, and a serial communication device 160U connected to the digital signal processor 101. The flash memory 160F can be replaced by a read-only memory, as an example. The data memory with battery-backup 160B stores instructions for selecting one of plural spatial filtering operations and instructions for selecting one of plural image density conversions or gamma corrections input from the operation panel 170. The stored instructions are used as default data or preference data for a spatial filtering operation and a gamma correcting operation respectively in the image processing apparatus 100.

The external image memory 180 can be configured as a memory having a first-in-first-out function in order to input data processed by the digital signal processor 101 through a data line 180A and to output the stored data once more to the digital signal processor 101 through a data line 180B. The external image memory 180 functions as a work memory for a recursive image processing operation by the digital signal processor 101.

The digital signal processor 101 includes a digital signal processor core 103, an internal address bus 103A, an internal data bus 103D, a random access memory (RAM) 104, a program loader 106, an inter-integrated-circuit (IIC) controller 114, and a register 115. The IIC controller 114 is connected with the program loader 106 by a signal line 14L, with the digital signal processor core 103 by a signal line 114P, with the register 115 by a signal line 114R, and with the CPU 160 by a serial communication line 160S. The IIC controller 114 sets parameters in the digital signal processor core 103, in the register 115, and in the program loader 106 according to a command sent from the CPU 160 via the serial communication line 160S following a predetermined serial communication protocol. The IIC controller 114 also reads out parameters stored in the digital signal processor core 103 and in the register 115, and then sends the read parameters to the CPU 160.

The register 115 is connected to the digital signal processor core 103 by a signal line 115P. The register 115 stores parameters for arithmetic and logical operations executed by the digital signal processor core 103 during a signal processing operation performed therein. For example, the register 115 stores coefficients of a spatial filter such as a smoothing filter, and the digital signal processor core 103 performs a spatial filtering operation using the stored coefficients.

The program loader 106 loads the RAM 104 with one of the plural sets of program modules for the plural image processing functions stored in the external program-storing device 150. Prior to loading operation, a start address for each of the program modules to be read out from the external program-storing device 150, the program code size thereof, and a start address in the RAM 104 to be loaded therein are set as loading parameters in the program loader 106 by the IIC controller 114.

Because the RAM 104 selectively stores only one set of program modules of an image processing function, the storage capacity thereof can be relatively small. However, instructions in the program modules loaded in the RAM 104 are read and executed by the digital signal processor core 103, and therefore it is desirable that the RAM 104 be accessed quickly so that the digital signal processor core 103 can execute the loaded program modules in a real-time manner. In the embodiment, the RAM 104 and the digital signal processor core 103 may be fabricated on a monolithic semiconductor device, and thus the RAM 104 can be accessed quickly, for example the RAM 104 can be accessed at the same clock speed that the digital signal processor core 103 operates.

On the other hand, the external program-storing device 150 stores plural sets of program modules for plural image processing functions, and therefore it is desirable that the external program-storing device 150 have a relatively large storage capacity. However, the external program-storing device 150 need not have a fast access time because the digital signal processor core 103 does not directly access the external program-storing device 150 for the programs to be executed thereby.

The digital signal processor core 103 inputs image data from input terminal 103I and from the external image memory 180 and outputs processed image data to a data output terminal 103B and to the external image memory 180. Both of the input terminal 103I and the output terminal 103B can convey 8-bit data at one time. The image data input from the external image memory 180 is data that has been once processed by the digital signal processor core 103. The digital signal processor core 103 fetches instructions of a program module loaded in the RAM 104 one after the other and processes input image data according to the fetched instructions. The digital signal processor core 103 can be implemented with multiple arithmetical and logical units, and thereby the digital signal processor core 103 can simultaneously process data of plural pixels such as, for example, data for 6748 pixels, which is the typical number of pixels included in a raster scanning line read by the image scanner 500.

Figure 2:
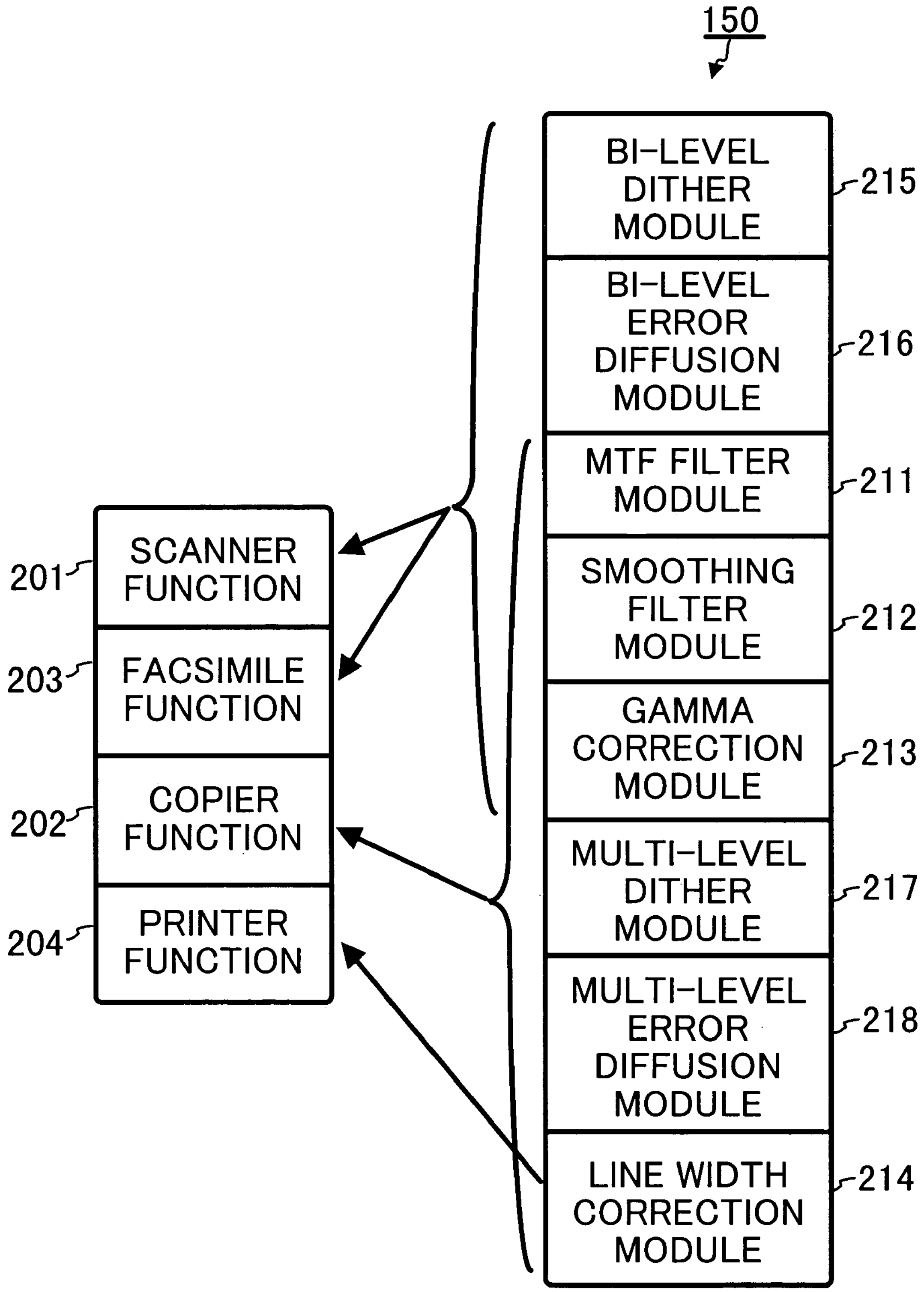
FIG. 2 is a schematic diagram illustrating a relationship between a plurality of image processing functions of the image processing apparatus of FIG. 1 and corresponding program modules to be loaded according to an embodiment of the present invention.

FIG. 2 is a schematic diagram illustrating a relationship between a plurality of image processing functions of the image processing apparatus 100 and program modules to be loaded into the RAM 104 corresponding with each of the image processing functions respectively, according to an embodiment of the present invention. Referring to FIG. 2, the image processing functions are referred to as an image scanner function 201 denoted by "SCANNER FUNCTION", a facsimile function 203 denoted by "FACSIMILE FUNCTION", a photocopier function 202 denoted by "COPIER FUNCTION", and a printer function 204 denoted by "PRINTER FUNCTION".

The external program-storing device 150 stores a bi-level dither-processing module 215 denoted by "BI-LEVEL DITHER MODULE", a bi-level error diffusion processing module 216 denoted by "BI-LEVEL ERROR DIFFUSION MODULE", a modulation-transfer-function (MTF) filtering module 211 denoted by "MTF FILTER MODULE", a smoothing filtering module 212 denoted by "SMOOTHING FILTER MODULE", a gamma correction module 213 denoted by "GAMMA CORRECTION MODULE", a multi-level dither-processing module 217 denoted by "MULTI-LEVEL DITHER MODULE", a multi-level error diffusion processing module 218 denoted by "MULTI-LEVEL-ERROR DIFFUSION MODULE", and a line width correction module 214 denoted by "LINE WIDTH CORRECTION MODULE".

A set of program modules for the scanner function 201 and the facsimile function 203 includes the bi-level dither module 215, the bi-level error diffusion module 216, the MTF filter module 211, the smoothing filter module 212, and the gamma correction module 213. A set of program modules for the copier function 202 includes the MTF filter module 211, the smoothing filter module 212, the gamma correction module 213, the multi-level dither module 217, the multi-level error diffusion module 218, and the line width correction module 214. A set of program modules for the printer function 204 includes only the line width correction module 214.

Again with reference to FIG. 1, when the operation panel 170 inputs, e.g., by an operator, an instruction to execute the scanner function 201 or the facsimile function 203, the operation panel 170 sends the instruction to the CPU 160. Then, the CPU 160 sends a program loading command accompanied with loading parameters to the IIC controller 114 via the serial communication line 160S, and then the IIC controller 114 sets the program loading command and the loading parameters in the program loader 106. As the loading parameters, a start address for each of the program modules stored in the external program-storing device 150 to be read out, the program code size for each of the program modules, and a start address to be loaded in the RAM 104 are set in the program loader 106.

In the case of executing the scanner function 201 or the facsimile function 203, according to the program loading command and loading parameters, the program loader 106 loads the bi-level dither module 215, the bi-level error diffusion module 216, the MTF filter module 211, the smoothing filter module 212, and the gamma correction module 213 into the RAM 104 by copying those modules from the external program-storing device 150. After the program loading operation, the image processing apparatus 100 starts the image processing operation of the scanner function 201 or the facsimile function 203.

Similarly, when the operation panel 170 inputs an instruction to execute the copier function 202, the program loader 106 loads the MTF filter module 211, the smoothing filter module 212, the gamma correction module 213, the multi-level dither module 217, the multi-level error diffusion module 218, and the line width correction module 214 into the RAM 104 from the external program-storing device 150. After the program loading operation, the image processing apparatus 100 starts the image processing operation of the copier function 202. Further, when the operation panel 170 inputs an instruction to execute the printer function 204, the program loader 106 loads the line width correction module 214 into the RAM 104 from the external program-storing device 150, and then the image processing apparatus 100 starts the image processing operation of the printer function 204.

Figure 3:
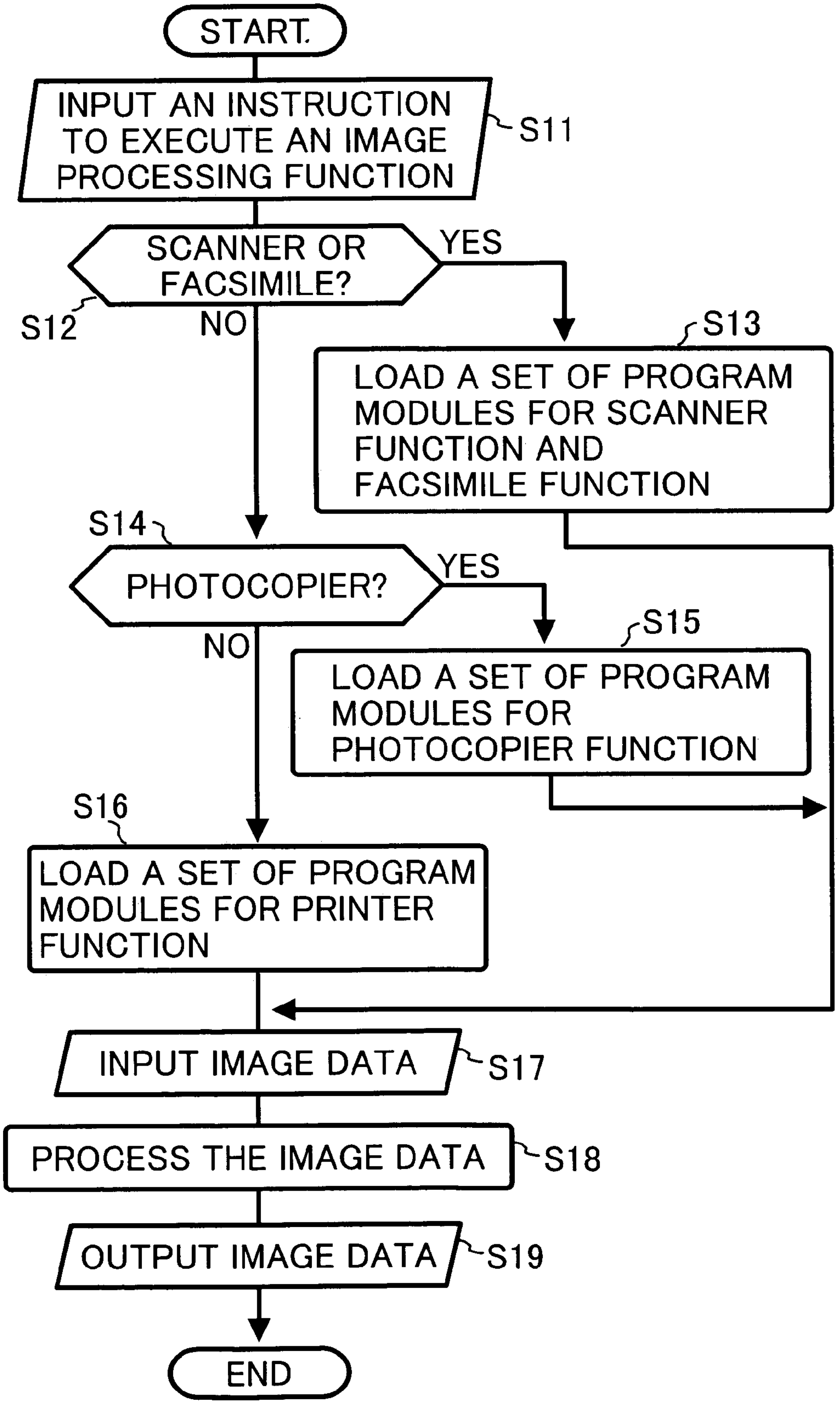
FIG. 3 is a flowchart illustrating operational steps for practicing an image processing operation in the image processing apparatus of FIG. 1.

FIG. 3 is a flowchart illustrating operational steps for practicing an image processing operation in the image processing apparatus 100 of FIG. 1. With reference to FIG. 3, in step S11, the operation panel 170 inputs an instruction to execute an image processing function, i.e., one of the scanner function 201, the facsimile function 203, the copier function 202, and the printer function 204 of FIG. 2. In step S12 the CPU 160 judges whether the input instruction is to execute the scanner function 201 or the facsimile function 203, and when the result of the judgment is true, i.e. Yes in step S12, the process proceeds to step S13, and when the result is false, i.e. No in step S12, the process proceeds to step S14.

In the step S13, the CPU 160 sends a program loading command to the program loader 106 to load the set of program modules for the scanner function 201 and the facsimile function 203. Then, the program loader 106 loads the set of program modules, i.e., the bi-level dither module 215, the bi-level error diffusion module 216, the MTF filter module 211, the smoothing filter module 212, and the gamma correction module 213 of FIG. 2, into the RAM 104 from the external program-storing device 150. The operation then proceeds to step S17.

In step S14 the CPU 160 judges whether the input instruction is to execute the copier function 202 of FIG. 2, and when the result of the judgment is true, i.e. Yes in step S14, the process proceeds to step S15 and when the result is false, i.e. No in step S14, the process proceeds to step S16. In the step S15, the CPU 160 sends a program loading command to the program loader 106 to load the set of program modules for the copier function 202. Then, the program loader 106 loads the set of program modules, i.e., the MTF filter module 211, the smoothing filter module 212, the gamma correction module 213, the multi-level dither module 217, the multi-level error diffusion module 218, and the line width correction module 214 of FIG. 2, into the RAM 104 from the external program-storing device 150. The operation then proceeds to step S17. In the step S16, the CPU 160 sends a program loading command to the program loader 106 to load the set of program modules for the printer function 204, since the input instruction is not for any of the scanner 201, facsimile 203, or copier 202 function, and thus must be the printer function 204. Then, the program loader 106 loads the set of program modules for the printer function 204, i.e., the line width correction module 214 of FIG. 2, into the RAM 104 from the external program-storing device 150. The operation then proceeds to step S17.

In step S17, the digital signal processor core 103 inputs image data from the input terminal 103I according to a program executing command sent from the CPU 160. In step S18, the digital signal processor core 103 processes the input image data by executing the loaded set of program modules, as loaded in steps S13, S15, S16 in the RAM 104. In step S19, the digital signal processor core 103 outputs processed image data to the output terminal 103B.

The operations executed by the CPU 160 in the above-described operational steps can be stored as a computer program in the flash memory 160F of the CPU 160.

As described above, the RAM 104 as a program-storing device is selectively loaded with only one set of program modules for a specified image processing function. Therefore, the RAM 104 does not require a capacity large enough for storing all the program modules at a time. In other words, the RAM 104 requires a capacity to store six program modules at most instead of eight program modules in the above-described embodiment. The capacity of the RAM 104 is thus reduced. In addition, the RAM 104 stores only program modules that are necessary for a specified image processing function; consequently, branching operations during an execution of a program are decreased, and therefore the execution speed of the image processing operation is increased.

Figure 4:
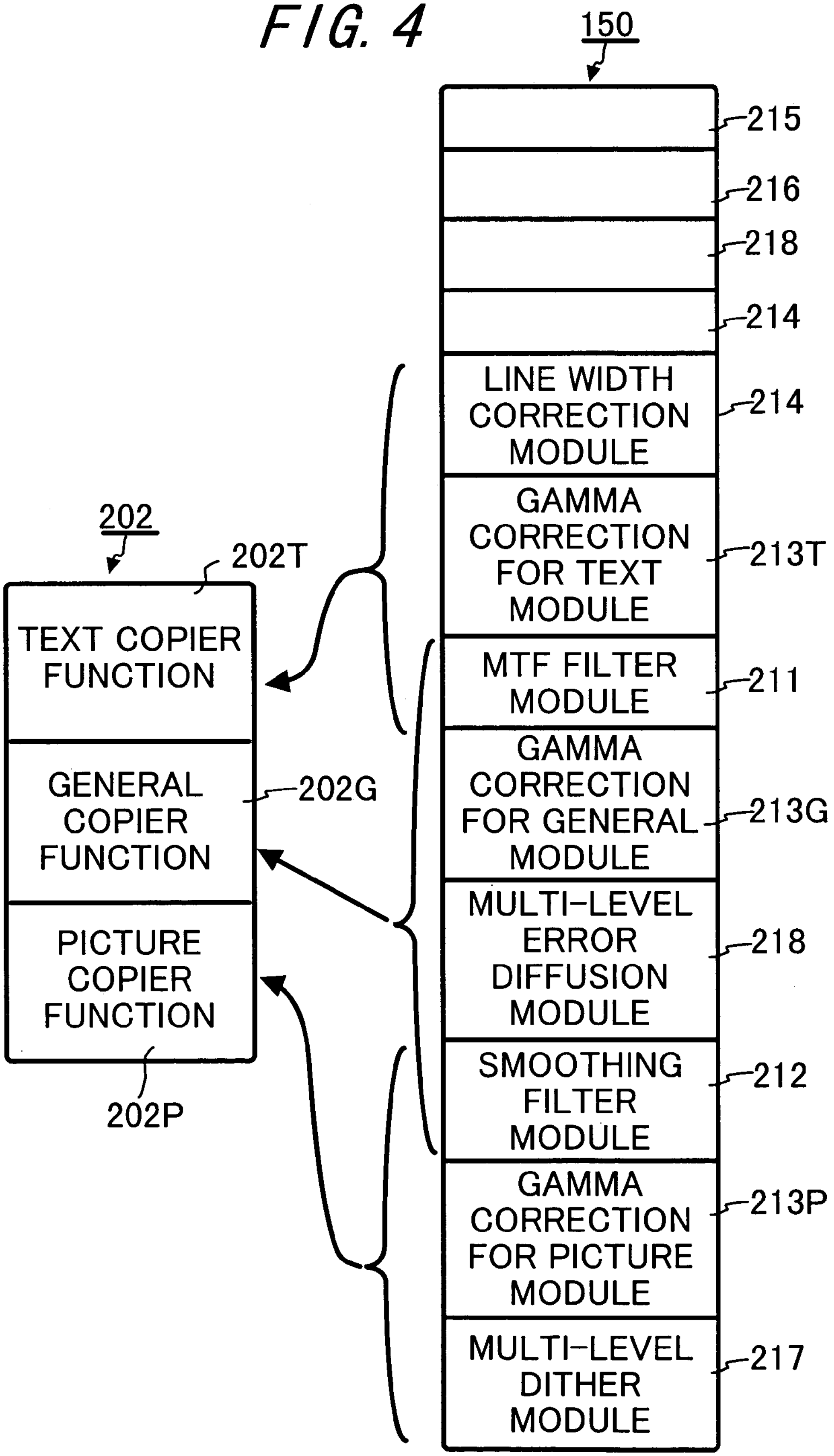
FIG. 4 is a schematic diagram illustrating a relationship between a plurality of image categories of original documents in a photocopier function of the image processing apparatus of FIG. 1 and corresponding program modules to be loaded according to another embodiment of the present invention.

FIG. 4 is a schematic diagram illustrating a relationship between a plurality of image categories of original documents in the copier function 202 of the image processing apparatus 100 of FIG. 1 and program modules to be loaded corresponding with each of the image categories respectively according to another embodiment of the present invention. In FIG. 4, the elements that are substantially the same as those in FIG. 2 are denoted by the same reference numerals. Referring to FIG. 4, the copier function 202 is divided into three modes for obtaining an optimized image quality of image reproduction. The three copier functions are a text copier function 202T denoted by "TEXT COPIER FUNCTION", a general copier function 202G denoted by "GENERAL COPIER FUNCTION", and a picture copier function 202P denoted by "PICTURE COPIER FUNCTION".

According to the above three copier modes, the gamma correction module 213 is divided into three modules, a gamma correction for text module 213T denoted by "GAMMA CORRECTION FOR TEXT MODULE", a gamma correction for general module 213G denoted by "GAMMA CORRECTION FOR GENERAL MODULE", and a gamma correction for picture module 213P denoted by "GAMMA CORRECTION FOR PICTURE MODULE".

A set of program modules for the text copier function 202T includes the line width correction module 214, the gamma correction for text module 213T, and the MTF filter module 211. A set of program modules for the general copier function 202G includes the MTF filter module 211, the gamma correction for general module 213G, the multi-level error diffusion module 218, and the smoothing filter module 212. A set of program modules for the picture copier function 202P includes the smoothing filter module 212, the gamma correction for picture module 213P, and the multi-level dither module 217.

According to the present embodiment, for executing one of the three copier functions 202T, 202G and 202P, the RAM 104 is loaded with four program modules at most. Therefore, the storage capacity of the RAM 104 can be further reduced and an execution speed of the image processing operation can be further increased.

In the scanner function 201 and the facsimile function 203, program modules for the scanner function 201 and facsimile function 203 can be divided and loaded into the RAM 104 in substantially the same manner as that described for the three copier functions 202T, 202G, and 202P.

Figure 5:
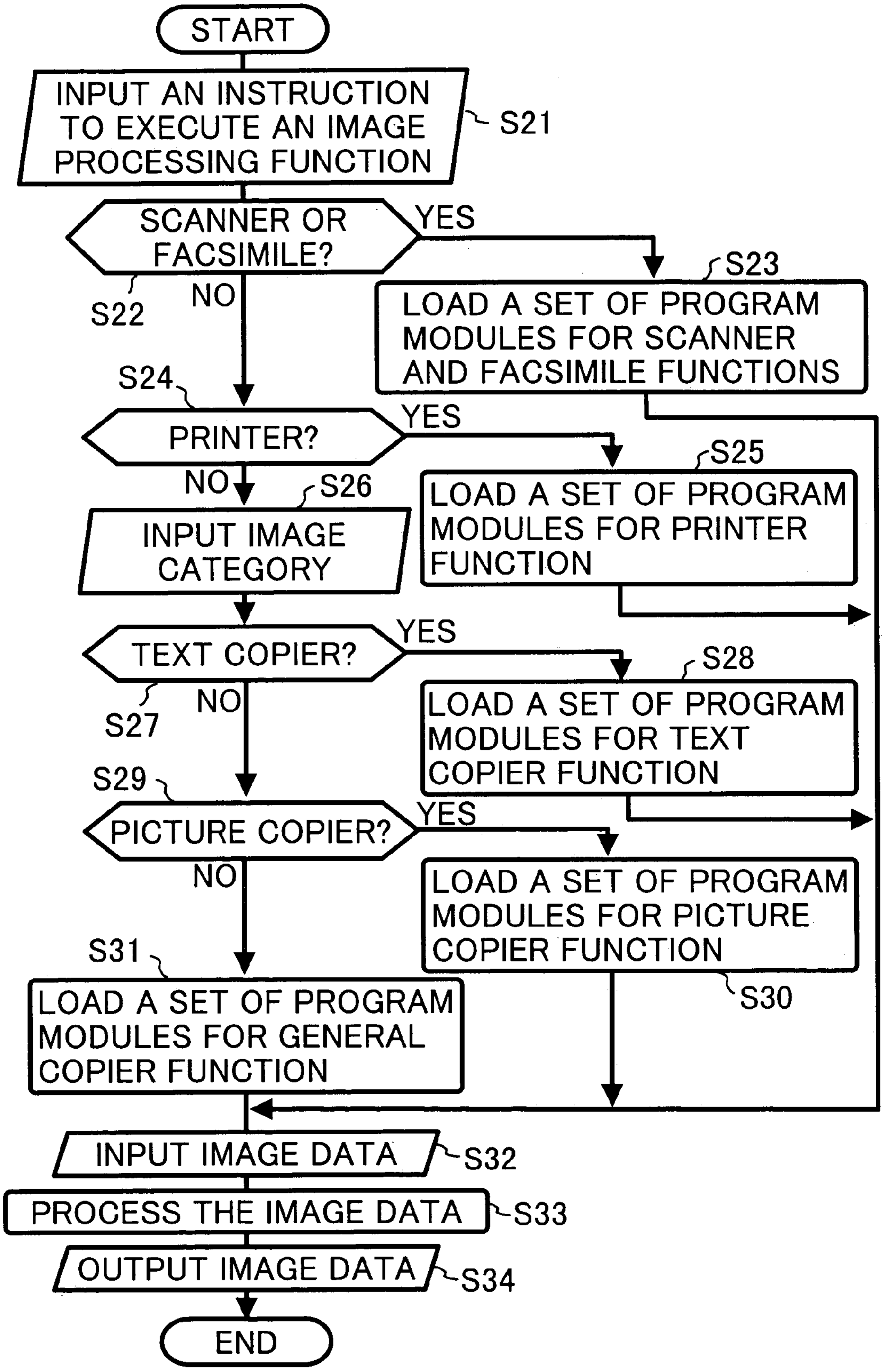
FIG. 5 is a flowchart illustrating operational steps for practicing another image processing operation in the image processing apparatus of FIG. 1.

FIG. 5 is a flowchart illustrating operational steps for practicing an image processing operation in the image processing apparatus 100. With reference to FIG. 5, in step S21, the operation panel 170 inputs an instruction to execute an image processing function, i.e., one of the scanner function 201, the facsimile function 203, the copier function 202, and the printer function 204 of FIG. 2. In step S22 the CPU 160 judges whether the input instruction is to execute the scanner function 201 or the facsimile function 203, and when the result of the judgment is true, i.e. Yes in step S22, the process proceeds to step S23 and when the result is false, i.e. No in step S22, the process proceeds to step S24.

In the step S23, the CPU 160 sends a program loading command to the program loader 106 to load the set of program modules for the scanner function 201 and the facsimile function 203. Then, the program loader 106 loads the set of program modules for the scanner and facsimile functions 201, 203, i.e., the bi-level dither module 215, the bi-level error diffusion module 216, the MTF filter module 211, the smoothing filter module 212, and the gamma correction module 213 of FIG. 2, into the RAM 104 from the external program-storing device 150. The operation then proceeds to step S32.

In step S24 the CPU 160 judges whether the input instruction is to execute the printer function 204, and when the result of the judgment is true, i.e. Yes in step S24, the process proceeds to step S25 and when the result is false, i.e. No in step S24, the process proceeds to step S26. In the step S25, the CPU 160 sends a program loading command to the program loader 106 to load the set of program modules for the printer function 204. Then, the program loader 106 loads the set of program modules for the printer function 204, i.e., the line width correction module 214 of FIG. 2, into the RAM 104 from the external program-storing device 150. The operation then proceeds to step S32.

In step S26, the operation panel 170 inputs an instruction to select an image category of a document to be photocopied. In step S27, the CPU 160 judges whether the input instruction is to select a text image category, and when the result of the judgment is true, i.e., Yes in step S27, the process proceeds to step S28 and when the result is false, i.e., No in step S27, the process proceeds to step S29. In the step S28, the CPU 160 sends a program loading command to the program loader 106 to load the set of program modules for the text copier function 202T. Then, the program loader 106 loads the set of program modules for the text copier function 202T, i.e., the line width correction module 214, the gamma correction for text module 213T, and the MTF filter module 211 of FIG. 4, into the RAM 104 from the external program-storing device 150. The operation then proceeds to step S32.

In the step S29, the CPU 160 judges whether the input instruction is to select a picture image category, and when the result of the judgment is true, i.e. Yes in step S29, the process proceeds to step S30 and when the result is false, i.e. No in step S29, the process proceeds to step S31. In the step S30, the CPU 160 sends a program loading command to the program loader 106 to load the set of program modules for the picture copier function 202P. Then, the program loader 106 loads the set of program modules for the picture copier function 202P, i.e., the smoothing filter module 212, the gamma correction for picture module 213P, and the multi-level dither module 217 of FIG. 4, into the RAM 104 from the external program-storing device 150. The operation then proceeds to step S32.

In the step S31, the CPU 160 sends a program loading command to the program loader 106 to load the set of program modules for the general copier function 202G since the input instruction is not for either of the text copier function 202T or the general copier function 202G. Then, the program loader 106 loads the set of program modules for the general copier function 202G, i.e., the MTF filter module 211, the gamma correction for general module 213G, the multi-level error diffusion module 218, and the smoothing filter module 212 of FIG. 4, into the RAM 104 from the external program-storing device 150. The operation then proceeds to step S32.

In step S32, the digital signal processor core 103 inputs image data from the input terminal 103I according to a program executing command sent from the CPU 160. In step S33, the digital signal processor core 103 processes the input image data by executing the loaded set of program modules in the RAM 104. In step S34, the digital signal processor core 103 outputs processed image data to the output terminal 103B.

The operations executed by the CPU 160 in the above-described operational steps executed by the CPU 160 can be stored as a computer program in the flash memory 160F of the CPU 160.

Figure 6:
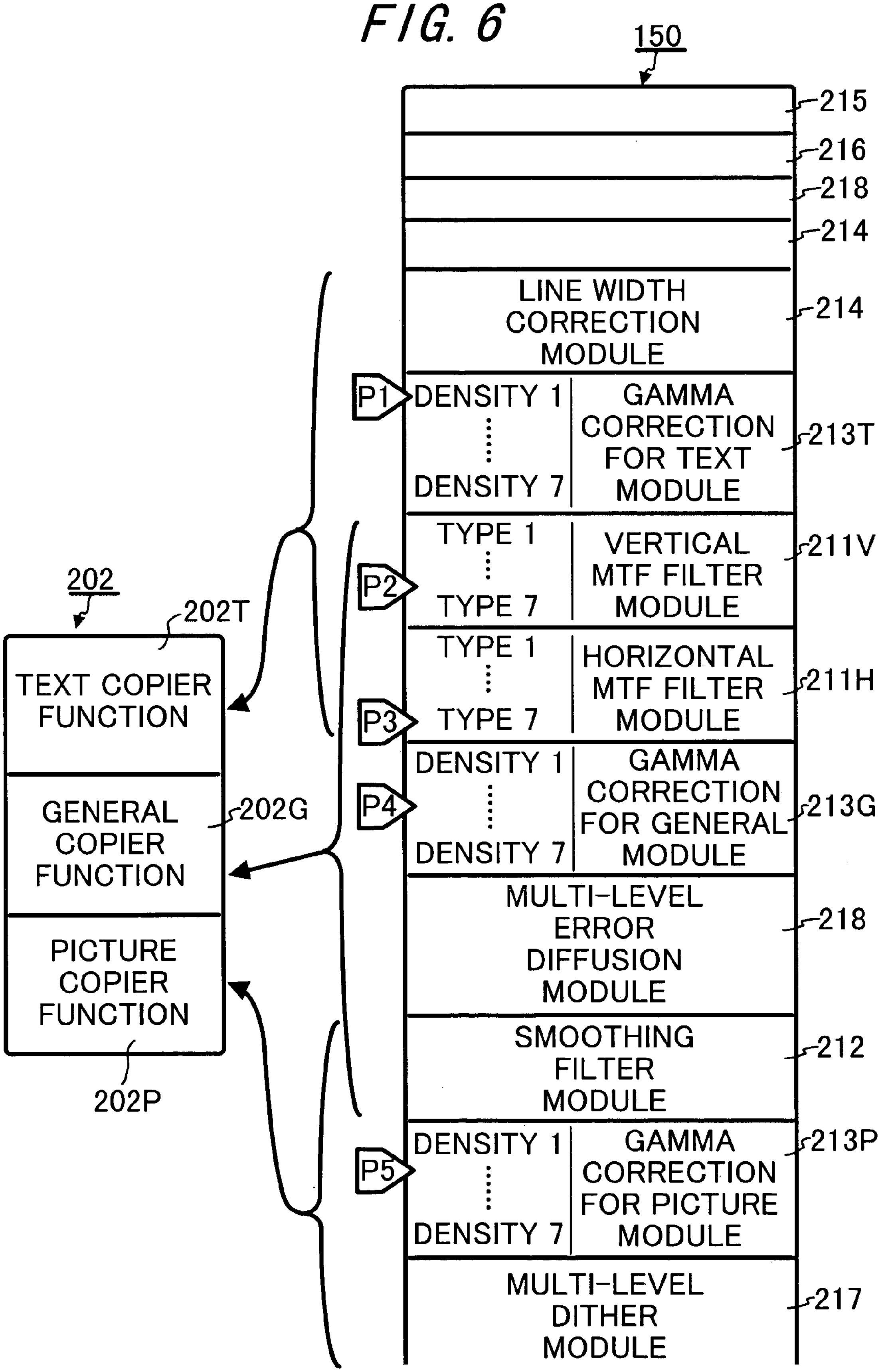
FIG. 6 is a schematic diagram illustrating a relationship between a plurality of image categories of original documents in a photocopier function of the image processing apparatus of FIG. 1, each of which having plural program sub-modules, and one of which is selectively loaded according to still another embodiment of the present invention.

FIG. 6 is a schematic diagram illustrating a relationship between the plurality of image categories in the copier function 202 of the image processing apparatus 100 and groups having plural program sub-modules and one of which is selectively loaded according to still another embodiment of the present invention. In FIG. 6, the elements that are substantially the same as those in FIG. 2 and FIG. 4 are denoted by the same reference numerals. Referring to FIG. 6, the MTF filter module 211 is divided into two modules, a vertical MTF filtering module 211V denoted by "VERTICAL MTF FILTER MODULE" and a horizontal MTF filtering module 211H denoted by "HORIZONTAL MTF FILTER MODULE". In addition, each of the gamma correction for text module 213T, the gamma correction for general module 213G, the gamma correction for picture module 213P, the vertical MTF filtering module 211V, and the horizontal MTF filtering module 211H is divided into seven different sub-modules respectively.

The divided sub-modules in each of the gamma correction for text module 213T, the gamma correction for general module 213G, and the gamma correction for picture module 213P are denoted by "DENSITY 1" to "DENSITY 7". "TYPE 1" to "TYPE 7" denote the divided sub-modules in each of the vertical MTF filter module 211V and the horizontal MTF filter module 211H. Each of the divided seven sub-modules yields a different image effect, and one of the seven sub-modules can be specified as a preference density or a preference type.

When one of the gamma correction for text module 213T, the gamma correction for general module 213G, the gamma correction for picture module 213P, the vertical MTF filter module 211V, and the horizontal MTF filter module 211H is specified for an image processing operation, one of the corresponding seven sub-modules is selectively loaded into the RAM 104. For example, when the gamma correction for text module 213T is specified, one of the Density 1-Density 7 sub-modules is selectively loaded into the RAM 104. For specifying to be loaded, each one of the seven sub-modules is pointed to by pointers P1, P2, P3, P4, and P5 denoted by "P1" through "P5" as illustrated in FIG. 6. Information about the pointers P1, P2, P3, P4, and P5 is stored in the data memory with battery-backup 160B in the CPU 160. The pointer information P1, P2, P3, P4, and P5 can be rewritten by a key operator or a service person of the image processing apparatus 100.

Figure 7:
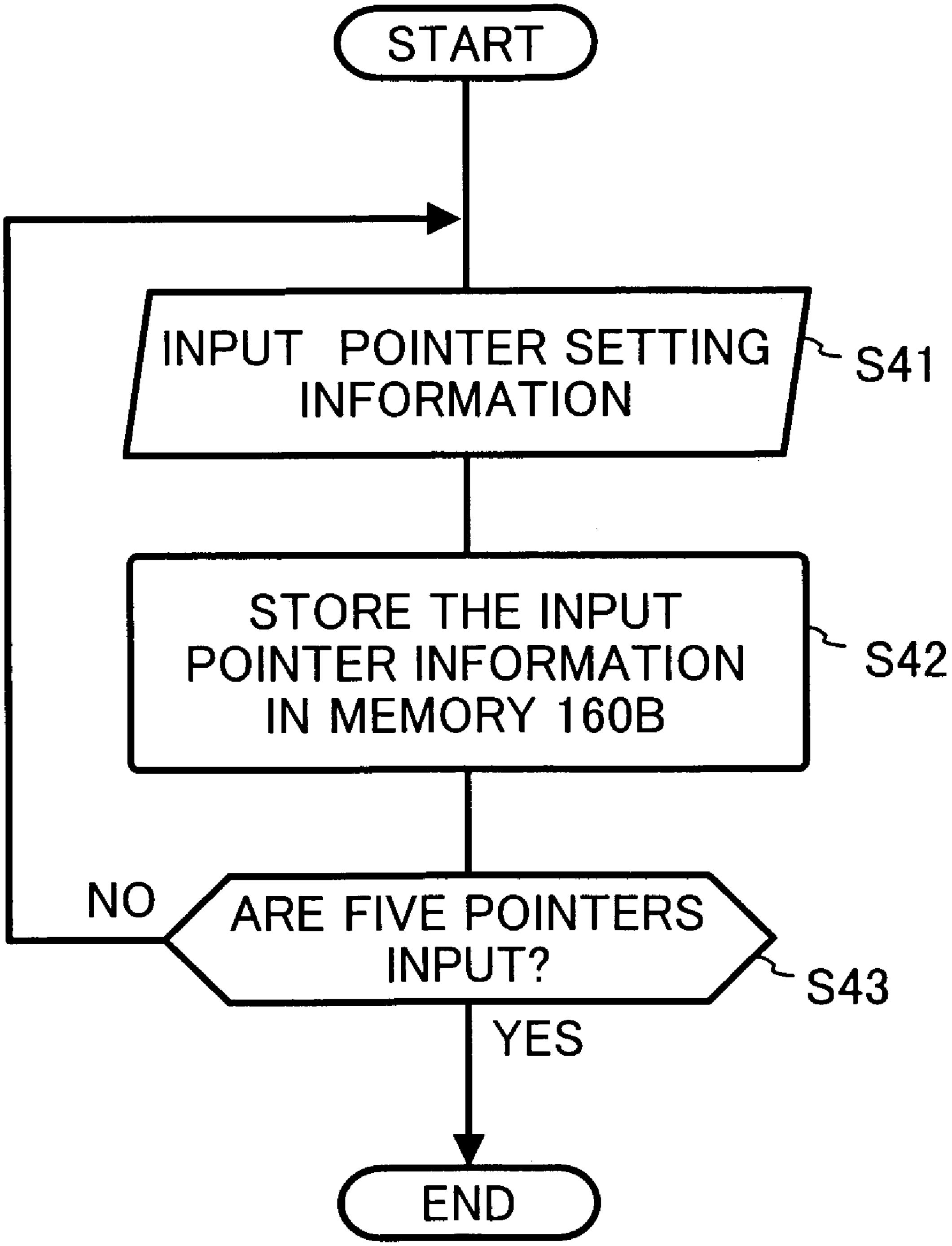
FIG. 7 is a flowchart illustrating operational steps for setting pointers to point to one of seven sub-modules in the image processing apparatus of FIG. 1.

FIG. 7 is a flowchart illustrating operational steps for setting pointers P1, P2, P3, P4, and P5, each of which points to one of the seven sub-modules. Referring to FIG. 7, in step S41, the CPU 160 inputs a pointer setting information via the operation panel 170, e.g., as set by an operator. In step S42, the CPU 160 stores the input pointer information in the data memory with battery-backup 160B of the CPU 160 such that the pointer points to an address of one of the seven sub-modules. In step S43, the CPU 160 judges whether the five pointers have been input, and when the result of the judgment is true, i.e. Yes in step S43, the process is completed and when the result is false, i.e. No in step S43, the process returns to step S41.

Figure 8:
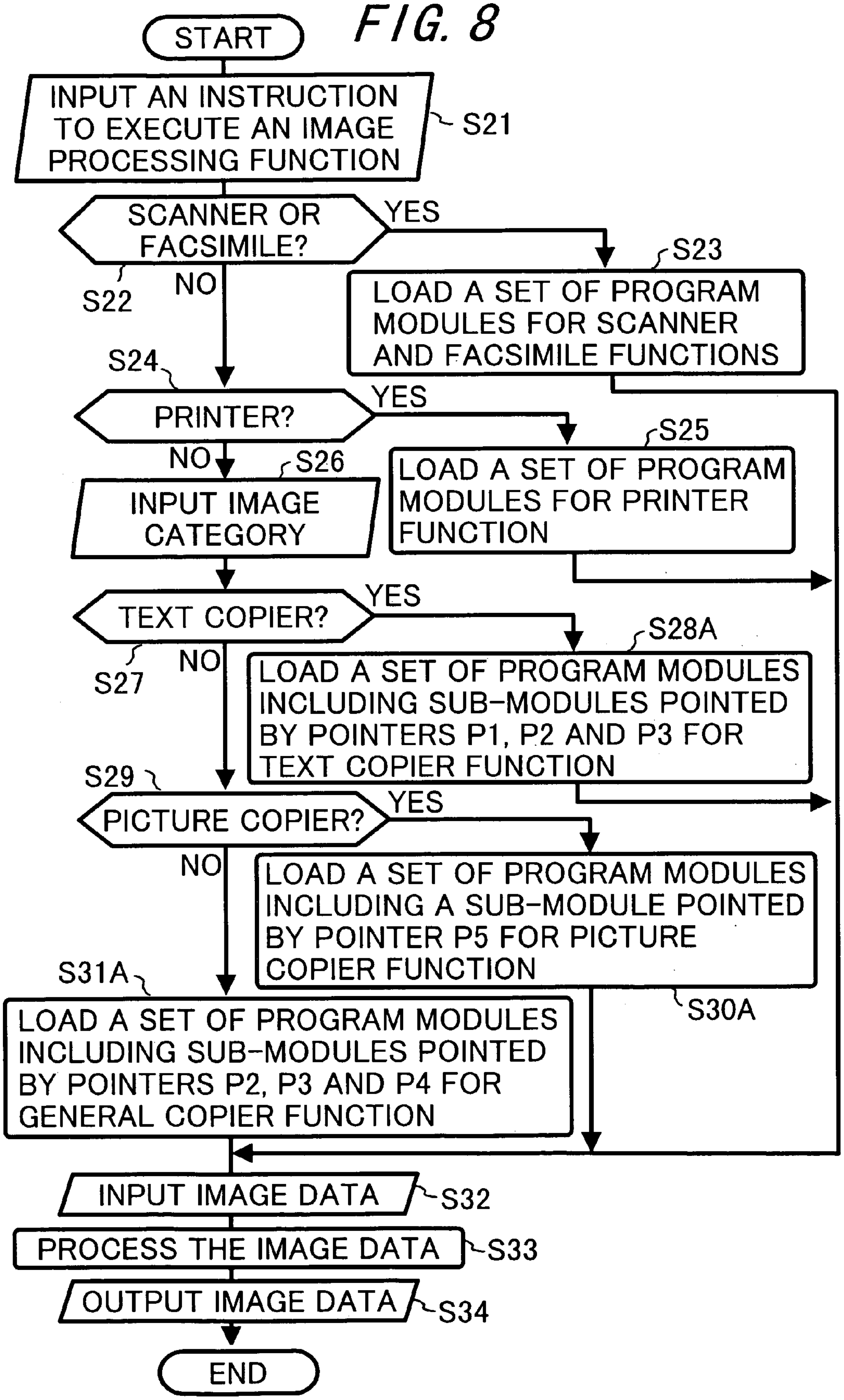
FIG. 8 is a flowchart illustrating operational steps for practicing another image processing operation in the image processing apparatus of FIG. 1.

Operational steps for practicing the embodiment of FIG. 6 are shown in the flowchart of FIG. 8. In this embodiment, operational steps for practicing an image processing are substantially the same as those described in FIG. 5 except for the step S28A, the step S30A, and the step S31A of FIG. 8. A description of the same steps in FIG. 8 as in FIG. 5 is not provided here to avoid redundancy. With reference to FIG. 8, in the step S28A, the CPU 160 sends a program loading command to the program loader 106 to load the set of program modules for the text copier function 202T with accompanying information on pointers P1, P2, and P3. Then, the program loader 106 loads the set of program modules for the text copier function 202T, i.e., the line width correction module 214, a sub-module in the gamma correction for text module 213T pointed to by the pointer P1, a sub-module in the vertical MTF filter module 211V pointed to by the pointer P2, and a sub-module in the horizontal MTF filter module 211H pointed to by the pointer P3, into the RAM 104 from the external program-storing device 150.

In the step S30A, the CPU 160 sends a program loading command to the program loader 106 to load the set of program modules for the picture copier function 202P with accompanying information on pointer P5. Then, the program loader 106 loads the set of program modules for the picture copier function 202P, i.e., the smoothing filter module 212, a sub-module in the gamma correction for picture module 213P pointed to by the pointer P5, and the multi-level dither module 217, into the RAM 104 from the external program-storing device 150.

In the step S31A, the CPU 160 sends a program loading command to the program loader 106 to load the set of program modules for the general copier function 202G with accompanying information on pointers P2, P3, and P4. Then, the program loader 106 loads the set of program modules for the general copier function 202G, i.e., a sub-module in the vertical MTF filter module 211V pointed to by the pointer P2, a sub-module in the horizontal MTF filter module 211H pointed to by the pointer P3, a sub-module in the gamma correction for general module 213G pointed to by the pointer P4, the multi-level error diffusion module 218, and the smoothing filtering module 212, into the RAM 104 from the external program-storing device 150.

In this embodiment of FIG. 8, a program code size of each of the sub-modules is smaller than that of the original (before divided) program module illustrated in FIG. 4, and therefore the storing capacity of the RAM 104 can be further reduced and the execution speed of the image processing operation can be further increased.

As described above, the novel image processing apparatus and method having a digital signal processor of the present invention decreases a storing capacity of a program-storing device.

Further, the novel image processing apparatus and method having a digital signal processor of the present invention increases a throughput of the image processing operation.

Obviously, numerous additional modifications and variations of the present invention are possible in light of the above teachings. In particular, features described for certain embodiments may be employed in a logical manner to other embodiments described herein. It is therefore to be understood that within the scope of the appended claims, the present invention may be practiced otherwise than as specifically described herein.

This document is based on Japanese patent application No. 10-331288 filed in the Japanese Patent Office on Nov. 20, 1999, and the entire contents of which are hereby incorporated herein by reference.

What is claimed is:

1. A data processing apparatus, configured to selectively execute a plurality of operation modes, comprising:

a first data storing device configured to store a plurality of different data modules configured to execute the plurality of operation modes;

a second data storing device configured to receive and store the data modules from the first data storing device; and a control device configured to transmit, when one of the plurality of operation modes is designated, the data modules needed for processings performed by the designated operation mode, from the first data storing device to the second data storing device, to store the needed data modules in the second data storing device, wherein the plurality of operation modes include a copier function and sub-functions of a text copier function, a general copier function, and a picture copier function, and the different data modules include modules for processing an original document based on the copier sub-functions, and the control device controls loading the needed data modules based on the copier sub-function designated according to an input instruction.

2. A data processing apparatus according to claim 1, wherein the data modules include a line width correction module, a gamma correction for text module, and a MTF filter module, which data modules are loaded into the second memory when the text copier function is designated.

3. A data processing apparatus according to claim 1, wherein the data modules include a MTF filter module, a gamma correction for general module, a multi-level error diffusion module, and a smoothing filter module, which data modules are loaded into the second memory when the general copier function is designated.

4. A data processing apparatus according to claim 1, wherein the data modules include a smoothing filter module, a gamma correction for picture module, and a multi-level filter module, which data modules are loaded into the second memory when the picture copier function is designated.

5. An image processing apparatus comprising:

a first data storing device configured to store a plurality of data modules configured to selectively execute a plurality of operation modes including operation modes of copying, printing, scanning, and facsimile communications;

a second data storing device configured to receive and store the data modules from the first data storing device; and a control device configured to transmit, when one of the plurality of operation modes is designated, the data modules needed for an image processing performed by the designated operation mode, from the first data storing device to the second data storing device, to store the needed data modules in the second data storing device, wherein the copying operation mode includes sub-functions of a text copier function, a general copier function, and a picture copier function, and the control device controls loading the needed data modules based on the copier sub-function designated according to an input instruction.

6. A data processing apparatus according to claim 5, wherein the data modules include a line width correction module, a gamma correction for text module, and a MTF filter module, which data modules are loaded into the second memory when the text copier function is designated.

7. A data processing apparatus according to claim 5, wherein the data modules include a MTF filter module, a gamma correction for general module, a multi-level error diffusion module, and a smoothing filter module, which data modules are loaded into the second memory when the general copier function is designated.

8. A data processing apparatus according to claim 5, wherein the data modules include a smoothing filter module, a gamma correction for picture module, and a multi-level filter module, which data modules are loaded into the second memory when the picture copier function is designated.

* * * * *